(12) United States Patent
Atohira et al.

(10) Patent No.: US 10,534,876 B2
(45) Date of Patent: Jan. 14, 2020

(54) SIMULATION DEVICE AND SIMULATION METHOD THAT CARRY OUT SIMULATION OF OPERATION OF ROBOT SYSTEM, AND RECORDING MEDIUM THAT RECORDS COMPUTER PROGRAM

(71) Applicant: FANUC CORPORATION, Yamanashi (JP)

(72) Inventors: Hiroyuki Atohira, Yamanashi (JP);
Yoshiharu Nagatsuka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 146 days.

(21) Appl. No.: 15/788,987

(22) Filed: Oct. 20, 2017

(65) Prior Publication Data
US 2018/0121578 A1 May 3, 2018

(30) Foreign Application Priority Data

Oct. 27, 2016 (JP) ................. 2016-211006

(51) Int. Cl.
*G06G 7/48* (2006.01)
*G06F 17/50* (2006.01)
*G06T 19/20* (2011.01)

(52) U.S. Cl.
CPC .......... *G06F 17/5009* (2013.01); *G06T 19/20* (2013.01); *G06F 2217/02* (2013.01); *G06T 2219/2004* (2013.01)

(58) Field of Classification Search
None
See application file for complete search history.

(56) References Cited

U.S. PATENT DOCUMENTS

| 7,881,917 B2 * | 2/2011 | Nagatsuka | B25J 9/1671 703/6 |
| 9,418,394 B2 * | 8/2016 | Atohira | G06T 1/00 |
| 2006/0184275 A1 | 8/2006 | Hosokawa et al. | |

FOREIGN PATENT DOCUMENTS

| CN | 101085523 A | 12/2007 |
| CN | 105773603 A | 7/2016 |

(Continued)

OTHER PUBLICATIONS

Zhou, Zhengrong. "The Applications and Practice of Additional Workpiece Coordinate System (G54. 1 Pn)." MATEC Web of Conferences. vol. 31. EDP Sciences, 2015.*

(Continued)

*Primary Examiner* — Rehana Perveen
*Assistant Examiner* — Nithya J. Moll
(74) *Attorney, Agent, or Firm* — Hauptman Ham, LLP

(57) ABSTRACT

A simulation device capable of easily constructing the layout of a three-dimensional model of a robot system in a virtual space. The simulation device includes a model arranging section that arranges a component model in a virtual space, the component model being a three-dimensional model of a component of the robot system; a reference setting section that sets a reference point, a reference axis, or a reference plane in the virtual space; a symmetric model generation section that generates a symmetric component model of the component model arranged in the virtual space, the symmetric component model being a three-dimensional model symmetric with respect to the reference point, the reference axis, or the reference plane; and a simulation section that executes a simulation to simulatively operate the component model and the symmetric component model in the virtual space.

9 Claims, 15 Drawing Sheets

(56) References Cited

FOREIGN PATENT DOCUMENTS

| JP | S62-223720 | A | 10/1987 |
|----|------------|---|---------|
| JP | 2003-150219 | A | 5/2003 |
| JP | 2008-299643 | A | 12/2008 |
| JP | 2014-100780 | A | 6/2014 |
| JP | 2016-129915 | A | 7/2016 |
| WO | 2004-085120 | A1 | 10/2004 |

OTHER PUBLICATIONS

Świder, Jerzy, and Adrian Zbilski. "The modeling and analysis of a partial loads in the FANUC AM100iB robot joints.,,." Machinning Science and Technology (2013).*

* cited by examiner

SIMULATION DEVICE AND SIMULATION METHOD THAT CARRY OUT SIMULATION OF OPERATION OF ROBOT SYSTEM, AND RECORDING MEDIUM THAT RECORDS COMPUTER PROGRAM

RELATED APPLICATIONS

The present application claims priority to Japanese Patent Application No. 2016-211006 filed Oct. 27, 2016, the disclosure of which is hereby incorporated by reference herein in its entirety.

BACKGROUND OF THE INVENTION

1. Field of the Invention

The invention relates to a simulation device and a simulation method that carry out a simulation of an operation of a robot system, and recording medium that records a computer program for carrying out the simulation.

2. Description of the Related Art

Simulation technology for operating a robot system in a virtual space is known (e.g., WO 2004/085120 and JP-A-2014-100780).

However, there is a need for technology whereby the layout of a three-dimensional model of a robot system can be easily constructed in a virtual space.

SUMMARY OF THE INVENTION

In an aspect of the invention, a simulation device configured to carry out a simulation of operation of a robot system, includes a model arranging section configured to arrange a component model in a virtual space, the component model being a three-dimensional model of a component of the robot system; and a reference setting section configured to set a reference point, a reference axis, or a reference plane in the virtual space.

The simulation device also includes a symmetric model generation section configured to generate symmetric component model which is a three-dimensional model symmetric to the component model arranged in the virtual space with respect to the reference point, the reference axis, or the reference plane; and a simulation section configured to carry out a simulation to simulatively operate the component model and the symmetric component model in the virtual space.

The symmetric model generation section may replicate a virtual operation parameter necessary for simulatively operating the component model in the virtual space, and give the virtual operation parameter to the generated symmetric component model. The robot system may include a robot configured to grip a workpiece, a conveyer configured to convey the workpiece, or a machine tool configured to machine the workpiece.

The component model may include a robot model which is a three-dimensional model of the robot, a conveyer model which is a three-dimensional model of the conveyer, or a machine tool model which is a three-dimensional model of the machine tool.

The virtual operation parameter may include a parameter relating to an origin and axis direction of a robot coordinate system used as a reference when simulatively operating the robot model in the virtual space, an origin and axis direction of a conveyer coordinate system used as a reference when simulatively operating the conveyer model in the virtual space, or an origin and axis direction of a machine tool coordinate system used as a reference when simulatively operating the machine tool model in the virtual space.

The symmetric model generation section may obtain a position symmetric to the component model with respect to the reference point, the reference axis, or the reference plane; and arrange the generated symmetric component model at the position such that the generated symmetric component model is symmetric to the component model with respect to the reference point, the reference axis, or the reference plane.

The model arranging section may arrange a plurality of component models in the virtual space. The simulation device may further include an input receiving section configured to receive an input operation for selecting at least one of the plurality of component models. The symmetric model generation section may generate the symmetric component model of the selected component model.

A plurality of coordinate systems may be arranged in the virtual space. The simulation device may further include a second input receiving section configured to receive an input operation for selecting one of the plurality of coordinate systems, and an input operation for selecting an origin of the selected coordinate system, an axis of the selected coordinate system, or a plane defined by the selected coordinate system. The reference setting section may set the selected origin, the selected axis, or the selected plane as the reference point, the reference axis, or the reference plane.

In another aspect of the invention, a method of carrying out a simulation of an operation of a robot system, includes arranging a component model in a virtual space, the component model being a three-dimensional model of a component of the robot system; and setting a reference point, a reference axis, or a reference plane in the virtual space.

The method also includes generating a symmetric component model which is a three-dimensional model symmetric to the component model arranged in the virtual space with respect to the reference point, the reference axis, or the reference plane; and carrying out a simulation to simulatively operate the component model and the symmetric component model in the virtual space.

In still another aspect of the invention, a computer-readable recording medium configured to record a computer program for carrying out a simulation of an operation of a robot system, the computer program causing a computer to function as a model arranging section configured to arrange a component model in a virtual space, the component model being a three-dimensional model of a component of the robot system; and a reference setting section configured to set a reference point, a reference axis, or a reference plane in the virtual space.

The computer program also causes the computer to function as a symmetric model generation section configured to generate a symmetric component model which is a three-dimensional model symmetric to the component model arranged in the virtual space with respect to the reference point, the reference axis, or the reference plane; and a simulation section configured to carry out a simulation to simulatively operate the component model and the symmetric component model in the virtual space.

The above-described and other objects, features and advantages of the invention will become more apparent from the following description of the embodiments in connection with the accompanying drawings, in which.

DETAILED DESCRIPTION

Figure 1:
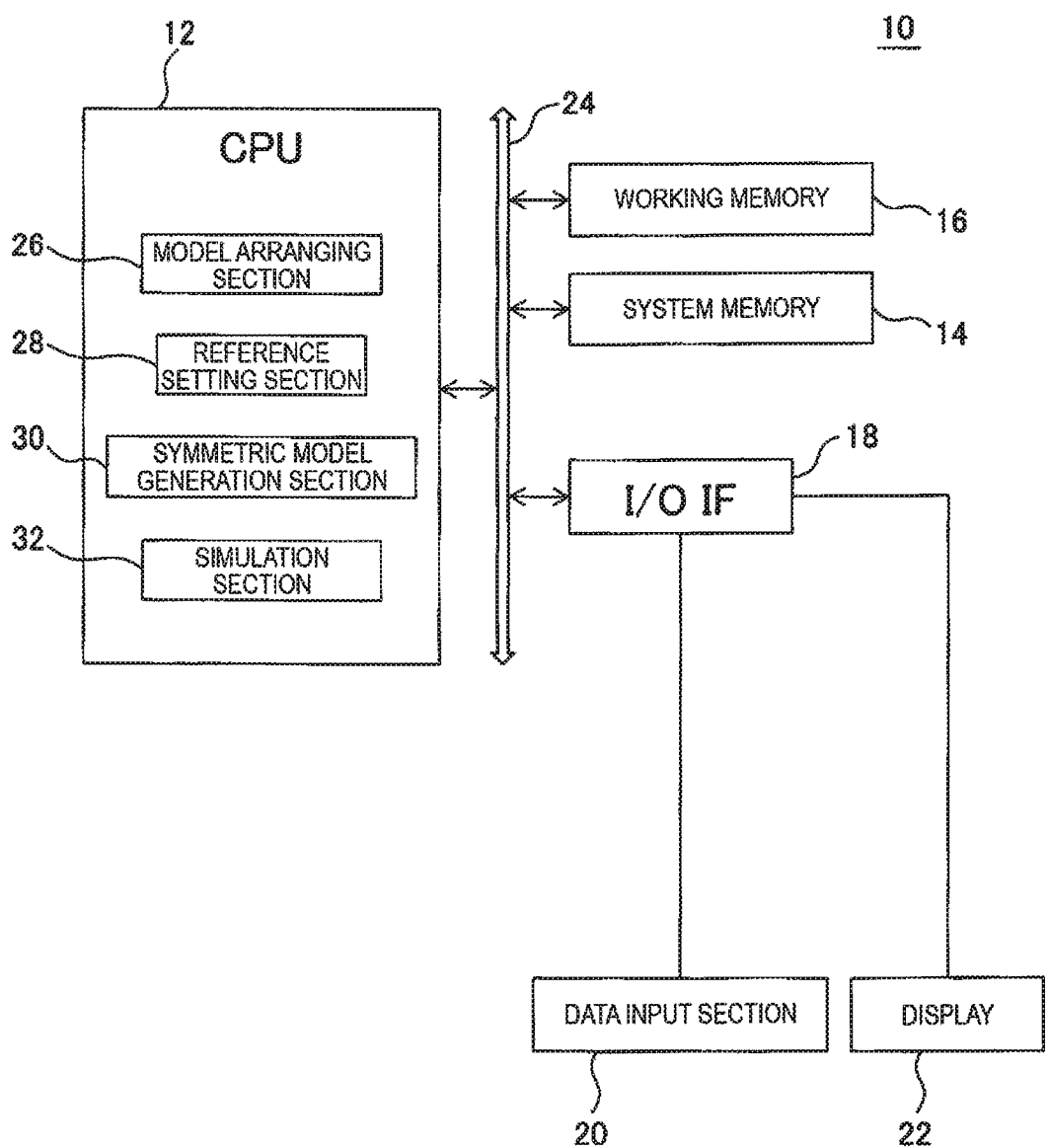
FIG. 1 is a block diagram of a simulation device according to an embodiment.

Hereinafter, embodiments of the invention are described in detail with reference to the drawings. Note that, in the various embodiments described below, similar components are assigned the same reference numerals, and repetitive descriptions thereof will be omitted.

A simulation device 10 according to an embodiment of the invention will be described with reference to FIG. 1. The simulation device 10 includes a CPU 12, a system memory 14, a working memory 16, an input/output interface (I/O interface) 18, a data input section 20, and a display 22.

The CPU 12 is communicably connected to the system memory 14, the working memory 16, and the I/O interface 18 via a bus 24, and executes various processes described below while communicating with these components.

The system memory 14 is a nonvolatile memory that is electrically erasable and recordable, and is comprised of an EEPROM (registered trademark) or the like, for example. The system memory 14 records constants, variables, setting values, parameters, programs, etc., necessary for carrying out a simulation described later, so as not to lose them when the simulation device 10 is shut down.

The working memory 16 temporarily stores data necessary for the CPU 12 to execute various processes. Further, the constants, variables, setting values, parameters, programs, etc., recorded in the system memory 14 are appropriately loaded onto the working memory 16, and the CPU 12 makes use of the data loaded onto the working memory 16 in order to execute the various processes.

The I/O interface 18 is communicably connected to the data input section 20, and receives data from the data input section 20 in accordance with a command from the CPU 12. Further, the I/O interface 18 is communicably connected to the display 22, and sends image data to the display 22 in accordance with a command from the CPU 12.

The I/O interface 18 may be comprised of e.g. an Ethernet port or a USB port, and may wiredly communicate with the display 22 and the data input section 20. Alternatively, the I/O interface 18 may wirelessly communicate with the display 22 and the data input section 20 via Wi-Fi or other wireless LAN.

The data input section 20 is comprised of e.g. a keyboard, a touch panel, or a mouse, and a user can operate the data input section 20 so as to input data. The data input section 20 sends the input data to the CPU 12 via the I/O interface 18.

The display 22 is comprised of e.g. a CRT, a liquid crystal display (LCD), or an organic EL display. The display 22 receives image data sent from the I/O interface 18, and displays it as an image viewable by the user.

The simulation device 10 is configured to carry out a simulation of an operation of a robot system including a component such as a robot, a conveyer, a machine tool, or the like.

Next, the function of the simulation device 10 according to an embodiment are described with reference to FIGS. 2 to 9. The flow illustrated in FIG. 2 is started when the user operates the data input section 20 so as to input a simulation start command, and the CPU 12 receives the simulation start command from the data input section 20, for example.

Figure 2:
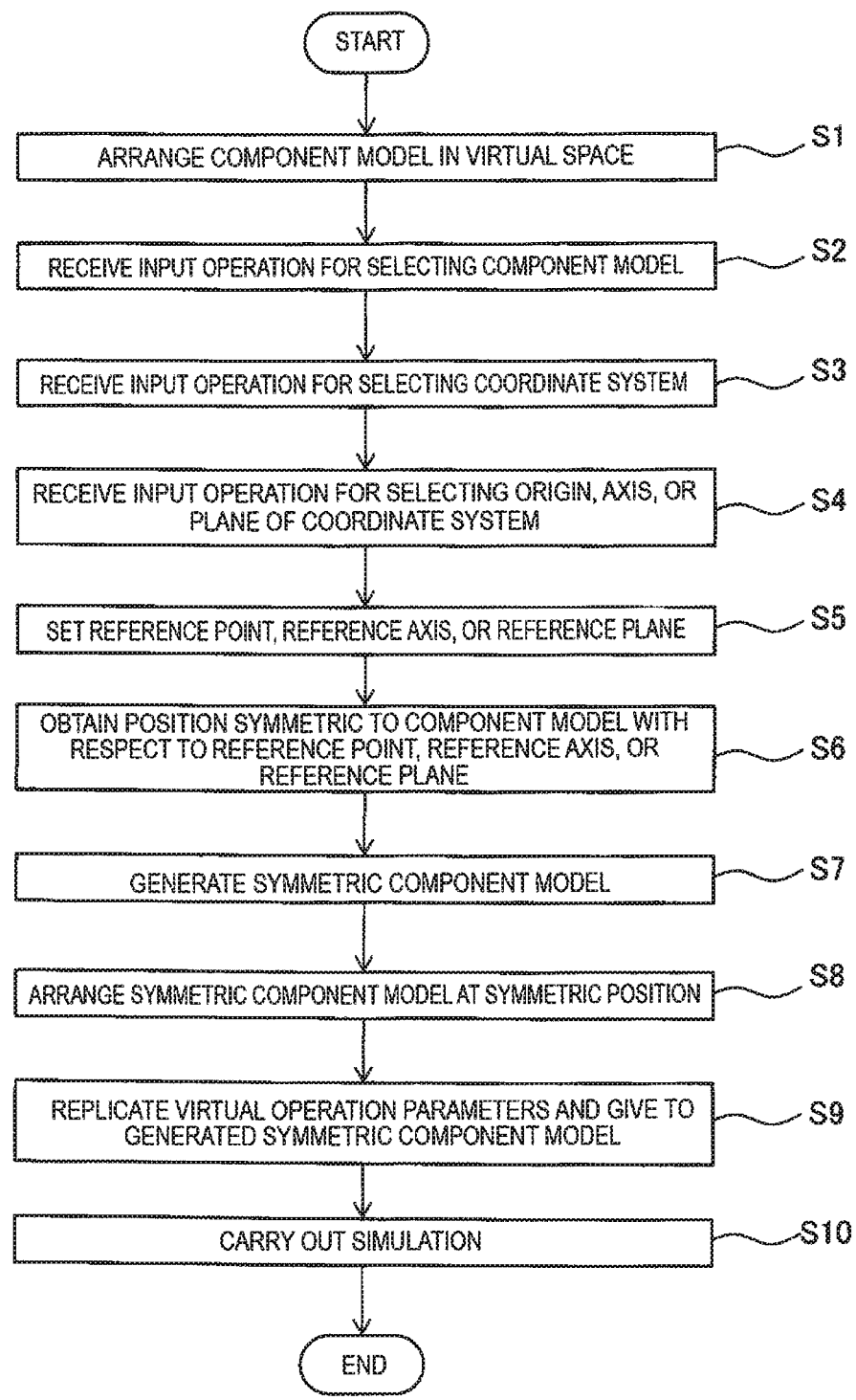
FIG. 2 is a flowchart illustrating an example of an operation flow of the simulation device depicted in FIG. 1.

Note that, the CPU 12 may execute steps S1 to S10 illustrated in FIG. 2 in accordance with a computer program. This computer program may be pre-stored in the system memory 14.

In this case, the system memory 14 functions as a computer-readable recording medium configured to record the computer program. Alternatively, the computer program may be recorded in a recording medium (e.g., a hard disk, an EEPROM, or the like) externally attached to the simulation device 10.

In step S1, the CPU 12 arranges a component model, which is a three-dimensional model of a component of a robot system, in a virtual space.

Figure 3:
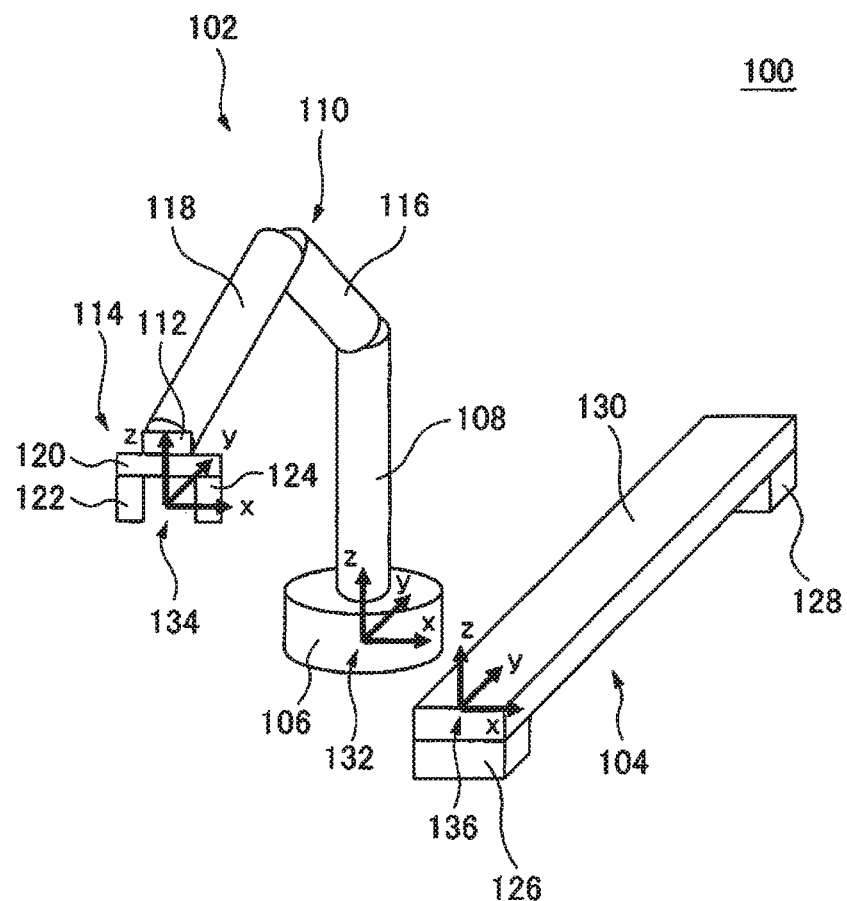
FIG. 3 is an image of virtual space generated in step S1 in FIG. 2.
Figure 3:
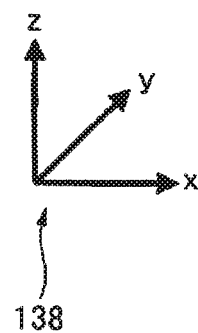

Specifically, in response to the input operation by the user, the CPU 12 arranges a robot model 102 and a conveyer model 104 in a virtual space 100 as illustrated in FIG. 3.

The robot model 102 is a three-dimensional model of a vertical articulated robot configured to grip and moves a workpiece, and includes a robot base model 106, a revolving drum model 108, a robot arm model 110, a wrist model 112, and a robot hand model 114.

The robot arm model 110 includes an upper arm model 116 rotatably connected to the revolving drum model 108, and a forearm model 118 rotatably connected to a distal end of the upper arm model 116.

The wrist model 112 is provided at a distal end of the forearm model 118, and supports the robot hand model 114 so as to be rotatable about three axes in the virtual space 100. The robot hand model 114 includes a hand base model 120 connected to the wrist model 112, and a plurality of finger models 122 and 124 connected to the hand base model 120 so as to open and close.

The conveyer model 104 is a three-dimensional model of a conveyer (e.g., a belt conveyor) capable of conveying a workpiece, and includes support section models 126 and 128, and a conveyor model 130 movably provided on the support section models 126 and 128.

The system memory 14 pre-stores a plurality of types of robot models including the robot model 102 and a plurality of types of conveyer models including the conveyer model 104. As an example, the CPU 12 generates image data in which the pluralities of types of robot models and conveyer models stored in the system memory 14 are represented in the form of a list, and displays it on the display 22.

The user operates the data input section 20 so as to select the robot model 102 and the conveyer model 104 from the list displayed on the display 22. The data input section 20 sends the input data input by the user to the CPU 12 via the I/O interface 18.

In response to the received input data, the CPU 12 reads out the robot model 102 and the conveyer model 104 from the pluralities of types of robot models and conveyer models stored in the system memory 14, and arranges the robot model 102 and the conveyer model 104 in the virtual space 100. Then, the CPU 12 generates image data of the virtual space 100, and displays it on the display 22 as an image of the virtual space 100 as illustrated in FIG. 3.

The system memory 14 stores various virtual robot operation parameters in association with the robot model 102. These virtual robot operation parameters are parameters necessary for simulatively operating the robot model 102 in the virtual space 100 in step S10 described later.

The virtual robot operation parameters include an origin and axial directions of a robot coordinate system 132, an origin and axial directions of a tool coordinate system 134, a maximum drive speed, a virtual movable range, etc.

The robot coordinate system 132 is a coordinate system used as a reference when the robot model 102 is operated in the virtual space 100, and is defined in the virtual space 100 by the origin and axial directions of the robot coordinate system 132 included in the virtual robot operation parameters.

In the embodiment illustrated in FIG. 3, the origin of the robot coordinate system 132 is arranged at the center of the robot base model 106, and the revolving drum model 108 is rotated about the z-axis of the robot coordinate system 132.

The tool coordinate system 134 is a coordinate system that defines the position and orientation of the robot hand model 114 in the virtual space 100, and is defined in the virtual space 100 by the origin and axial directions of the tool coordinate system 134 included in the virtual robot operation parameters.

In the embodiment illustrated in FIG. 3, the tool coordinate system 134 is set such that the origin thereof is arranged between the finger models 122 and 124 of the robot hand model 114, and the z-axis thereof is orthogonal to an opening and closing direction of the finger models 122 and 124.

The robot model 102 operates the revolving drum model 108, the robot arm model 110, and the wrist model 112 in the virtual space 100 with using the robot coordinate system 132 as a reference, such that the position and posture of the robot hand model 114 coincides with a position and orientation defined by the tool coordinate system 134.

The maximum drive speed is a parameter for determining the maximum speed (rotational speed) at which the robot model 102 drives the revolving drum model 108, the robot arm model 110, or the wrist model 112 in the virtual space 100.

The virtual movable range is a parameter indicating a movable range in which the robot model 102 can move the robot hand model 114 in the virtual space 100 (i.e. a range in which the tool coordinate system 134 can be set).

Further, the system memory 14 stores various virtual conveyer operation parameters in association with the conveyer model 104. These virtual conveyer operation parameters are necessary for simulatively operating the conveyer model 104 in the virtual space 100 in step S10 described later.

The virtual conveyer operation parameters include an origin and axial directions of a conveyer coordinate system 136, and a convey speed of the conveyor model 130, etc.

The conveyer coordinate system 136 is a coordinate system used as a reference when the conveyor model 130 is simulatively operated in the virtual space 100, and is defined in the virtual space 100 by the origin and axial directions of the conveyer coordinate system 136 included in the virtual conveyer operation parameters.

In the embodiment illustrated in FIG. 3, the origin of the conveyer coordinate system 136 is arranged at a center of one end part of the conveyor model 130, and the conveyor model 130 is moved in the y-axis direction of the conveyer coordinate system 136.

The convey speed is a parameter for determining the speed at which a workpiece model is conveyed by the conveyor model 130 in the virtual space 100 (i.e. the movement speed of the conveyor model 130).

As illustrated in FIG. 3, the CPU 12 arranges the robot coordinate system 132, the tool coordinate system 134, and the conveyer coordinate system 136 in the virtual space 100, together with the robot model 102, the conveyer model 104. Further, a main coordinate system 138 that defines the three-dimensional coordinates of the virtual space 100 is also arranged in the virtual space 100.

Thus, in this embodiment, the CPU 12 functions as a model arranging section 26 (FIG. 1) configured to arrange component models, such as the robot model 102 and the conveyer model 104, in the virtual space 100.

In step S2, the data input section 20 receives an input operation for selecting a component model. Specifically, the user operates the data input section 20 (e.g., a mouse) so as to select at least one of a plurality of component models (i.e., the robot model 102 and the conveyer model 104) displayed on the display 22.

Below, a case is described in which the user selects the robot model 102. In this case, the data input section 20 receives the input operation by the user, and sends the input data indicating the selection of the robot model 102 to the CPU 12 via the I/O interface 18. In response to the received input data, the CPU 12 determines the robot model 102 as the replication subject.

Thus, in this embodiment, the data input section 20 functions as an input receiving section configured to receive an input operation for selecting one of the plurality of component models (the robot model 102 and the conveyer model 104) arranged in the virtual space 100.

Note that, in order to improve the visibility for the user, the CPU 12 may highlight the robot model 102 determined as the replication subject in step S2 (e.g., change the type or tone of color of the robot model 102, or blink the robot model 102) in the display 22.

In step S3, the data input section 20 receives an input operation for selecting a coordinate system used as a reference when generating a symmetric component model in the following step S7. Specifically, the user operates the data input section 20 (e.g., a mouse) so as to select one of the robot coordinate system 132, the tool coordinate system 134, the conveyer coordinate system 136, and the main coordinate system 138 in FIG. 3.

Below, a case is described in which the user selects the conveyer coordinate system 136. In this case, the data input section 20 receives the input operation by the user, and sends the input data indicating the selection of the conveyer coordinate system 136 to the CPU 12 via the I/O interface 18. In response to the received input data, the CPU 12 determines the conveyer coordinate system 136 as a reference coordinate system.

Thus, in this embodiment, the data input section 20 functions as a second input receiving section configured to receive an input operation for selecting one of a plurality of coordinate systems (i.e., the robot coordinate system 132, the tool coordinate system 134, the conveyer coordinate system 136, and the main coordinate system 138) arranged in the virtual space 100.

Figure 4:
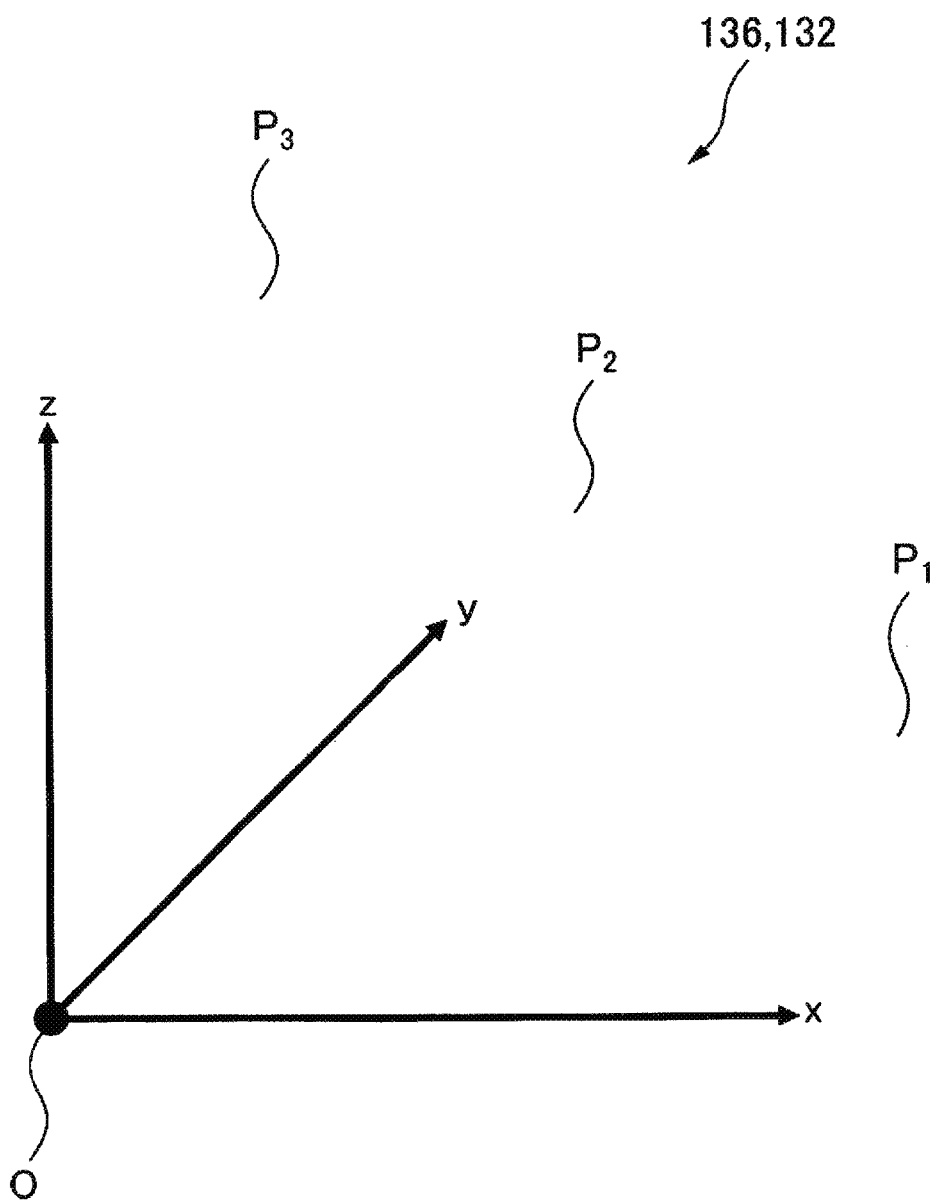
FIG. 4 is an enlarged image of a coordinate system generated in step S3 in FIG. 2.

Subsequently, as illustrated in FIG. 4, the CPU 12 displays the conveyer coordinate system 136 determined as the reference coordinate system on the display 22. In the conveyer coordinate system 136 illustrated in FIG. 4, an origin O, an x-y plane $P_1$, an x-z plane $P_2$, and a y-z plane $P_3$ are newly displayed in addition to the x-axis, the y-axis, and the z-axis.

In step 34, the data input section 20 receives an input operation for selecting the origin or axis of the coordinate system selected in step S3, or a plane defined by the selected coordinate system.

Specifically, the user operates the data input section 20 (e.g., a mouse) so as to select one of the origin O, the x-axis, the y-axis, the z-axis, the x-y plane $P_1$, the x-z plane $P_2$, and the y-z plane $P_3$ of the conveyer coordinate system 136 displayed on the display 22 as illustrated in FIG. 4.

Below, a case is described in which the user selects the y-z plane $P_3$ of the conveyer coordinate system 136. In this case, the data input section 20 receives the input operation by the user, and sends the input data indicating the selection of the y-z plane $P_3$ of the conveyer coordinate system 136 to the CPU 12 via the I/O interface 18.

Thus, in this embodiment, the data input section 20 functions as the second input receiving section configured to receive an input operation for selecting the origin O, the x-axis, the y-axis, the z-axis, the x-y plane $P_1$, the x-z plane $P_2$, or the y-z plane $P_3$ of the coordinate system selected in step S3 (e.g., the conveyer coordinate system 136 or the robot coordinate system 132).

In step S5, the CPU 12 sets a reference point, a reference axis, or a reference plane. Specifically, in response to the input data received from the data input section 20 in step S4, the CPU 12 sets the y-z plane $P_3$ of the conveyer coordinate system 136 illustrated in FIG. 4 as a reference plane $P_3$.

Figure 5:
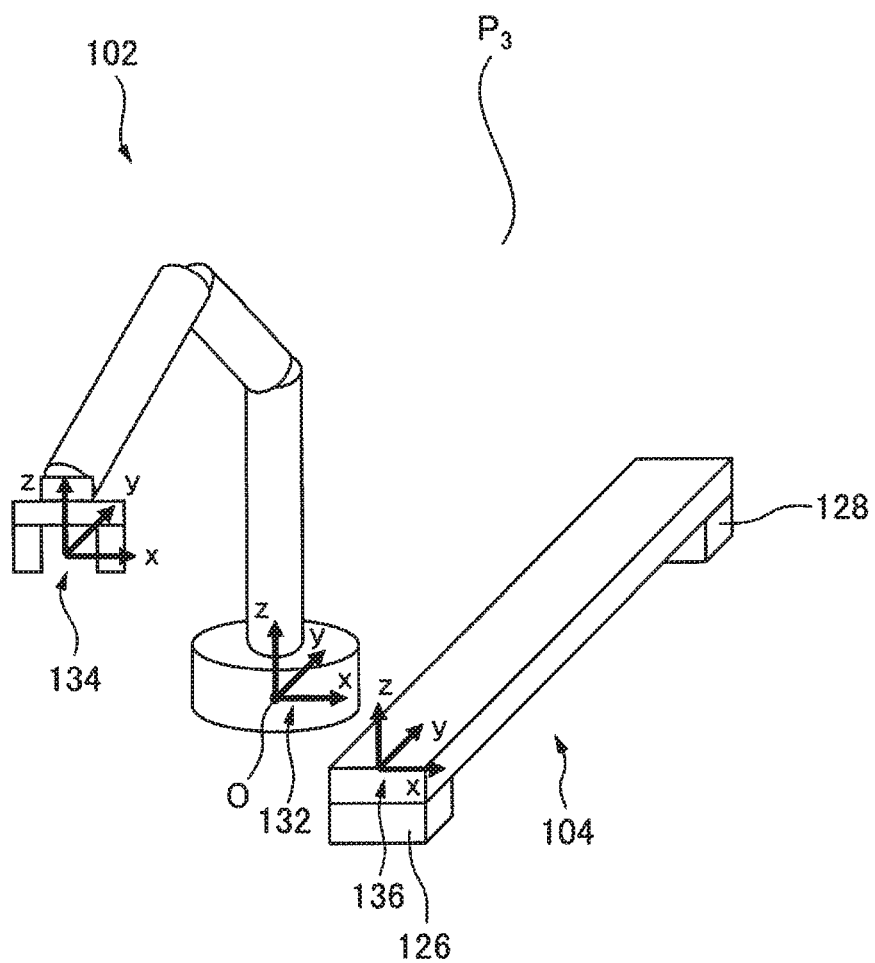
FIG. 5 is an image of virtual space generated in step S4 in FIG. 2.
Figure 5:
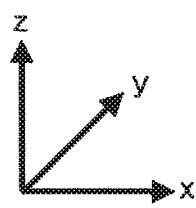
Figure 5:

Then, the CPU 12 displays the reference plane $P_3$ on the display 22 as illustrated in FIG. 5. In FIG. 5, the reference plane $P_3$ is displayed enlarged for the user to easily recognize the reference plane $P_3$. Thus, in this embodiment, the CPU 12 functions as a reference setting part 28 (FIG. 1) configured to set a reference point, a reference axis, or a reference plane in the virtual space.

In step S6, the CPU 12 obtains a position symmetric to the component model with respect to the reference point, the reference axis, or the reference plane. As an example, the CPU 12 obtains the coordinates of a symmetric origin O' (FIG. 6) symmetric to the origin O of the robot coordinate system 132 with respect to the reference plane $P_3$.

Figure 6:
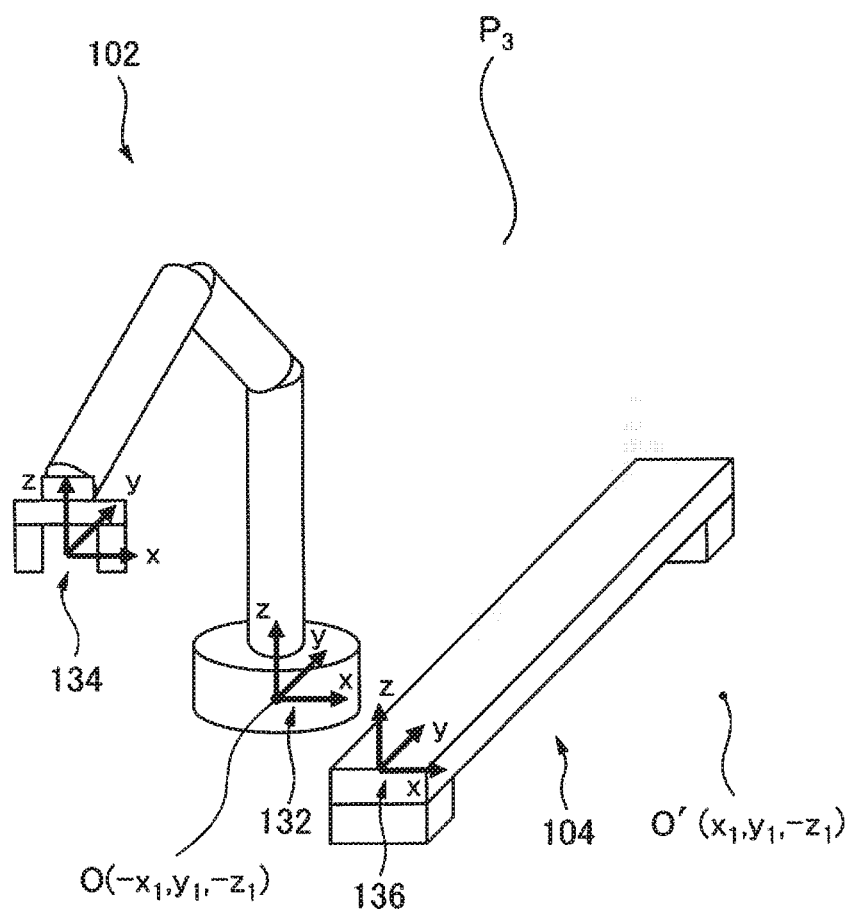
FIG. 6 is an image of virtual space generated in step S6 in FIG. 2.

For example, as illustrated in FIG. 6, if the coordinates in the conveyer coordinate system 136 of the origin O of the robot coordinate system 132 are $(-x_1, y_1, -z_1)$, the coordinates in the conveyer coordinate system 136 of the symmetric origin O can be obtained as $(x_1, y_1, -z_1)$.

The CPU 12 stores the thus-obtained coordinates $(x_1, -z_1)$ of the symmetric origin O' in the working memory 16 as coordinates representing a position symmetric to the robot model 102 with respect to the reference plane $P_3$.

In step S7, the CPU 12 generates a symmetric component model. Specifically, the CPU 12 generates a symmetric robot model 102M, which is a three-dimensional model symmetric to the robot model 102 determined as the replication subject in step S2 with respect to the reference plane $P_3$, with using information of the robot model 102 stored in the system memory 14.

Figure 7:
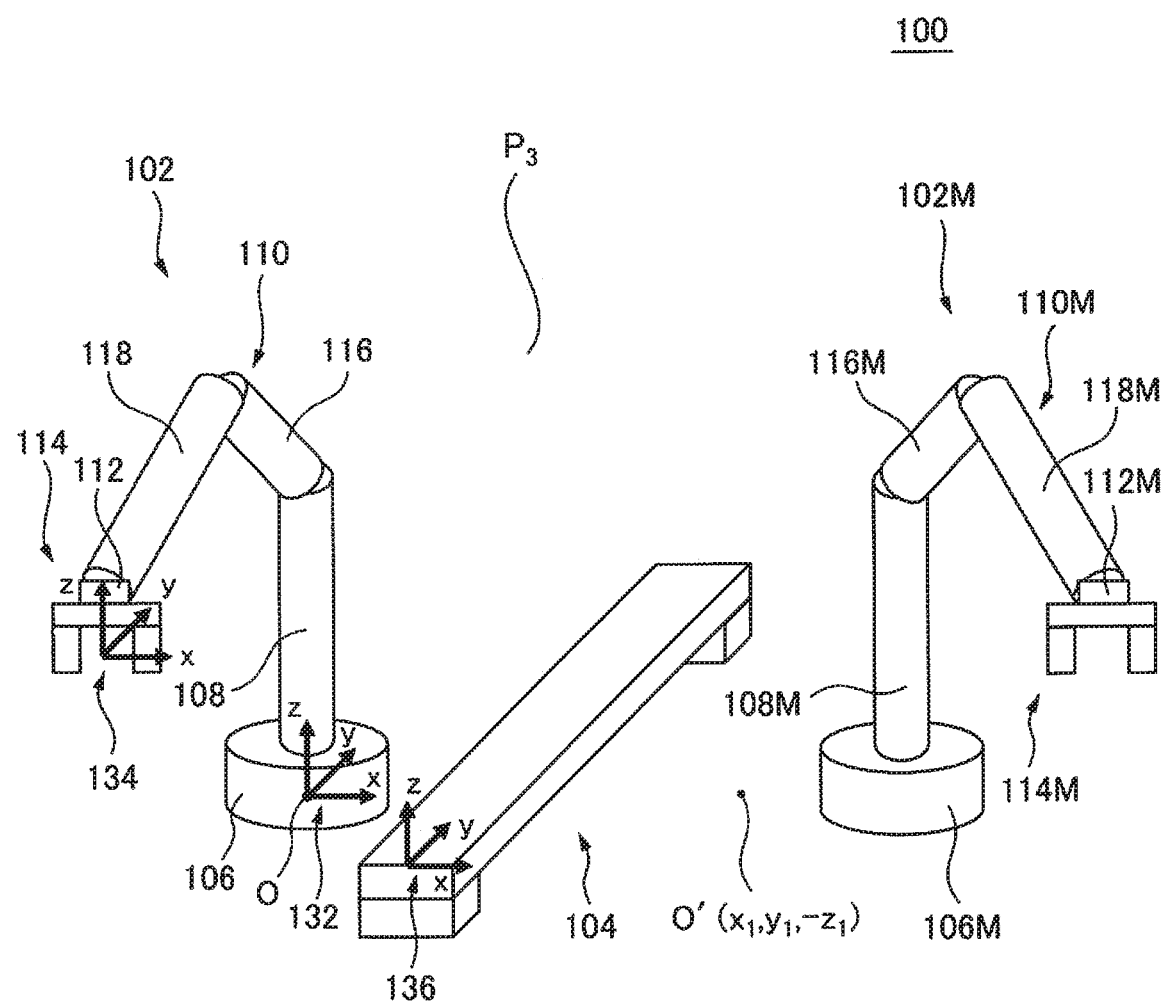
FIG. 7 is an image of virtual space generated in step S7 in FIG. 2.

The generated symmetric robot model 102M is illustrated in FIG. 7. The symmetric robot model 102M includes a symmetric robot base model 106M, a symmetric revolving drum model 108M, a symmetric robot arm model 110M, a symmetric wrist model 112M, and a symmetric robot hand model 114M.

The symmetric robot base model 106M, the symmetric revolving drum model 108M, the symmetric robot arm model 110M, the symmetric wrist model 112M, and the symmetric robot hand model 114M are three-dimensional models having shapes which are symmetric to the robot base model 106, the revolving drum model 108, the robot arm model 110, the wrist model 112, and the robot hand model 114, respectively, with respect to the reference plane $P_3$.

Thus, in this embodiment, the CPU 12 functions as a symmetric model generation part 30 (FIG. 1) configured to generate the symmetric component model.

In step S8, the CPU 12 arranges the symmetric component model at the position obtained in step S6. Specifically, the CPU 12 arranges the symmetric robot model 102M generated in step S7 at the symmetric origin O' detected in step S6.

At this time, the symmetric robot model 102M is arranged with respect to the symmetric origin O' so that the position of the symmetric origin O' with respect to the symmetric robot model 102M is the same as the position of the origin O of the robot coordinate system 132 with respect to the robot model 102.

More specifically, in this embodiment, the origin O of the robot coordinate system 132 is arranged at the center of the robot base model 106 as described above. Accordingly, the symmetric robot model 102M is arranged with respect to the symmetric origin O' so that the symmetric origin O' is arranged at the center of the symmetric robot base model 106M.

Figure 8:
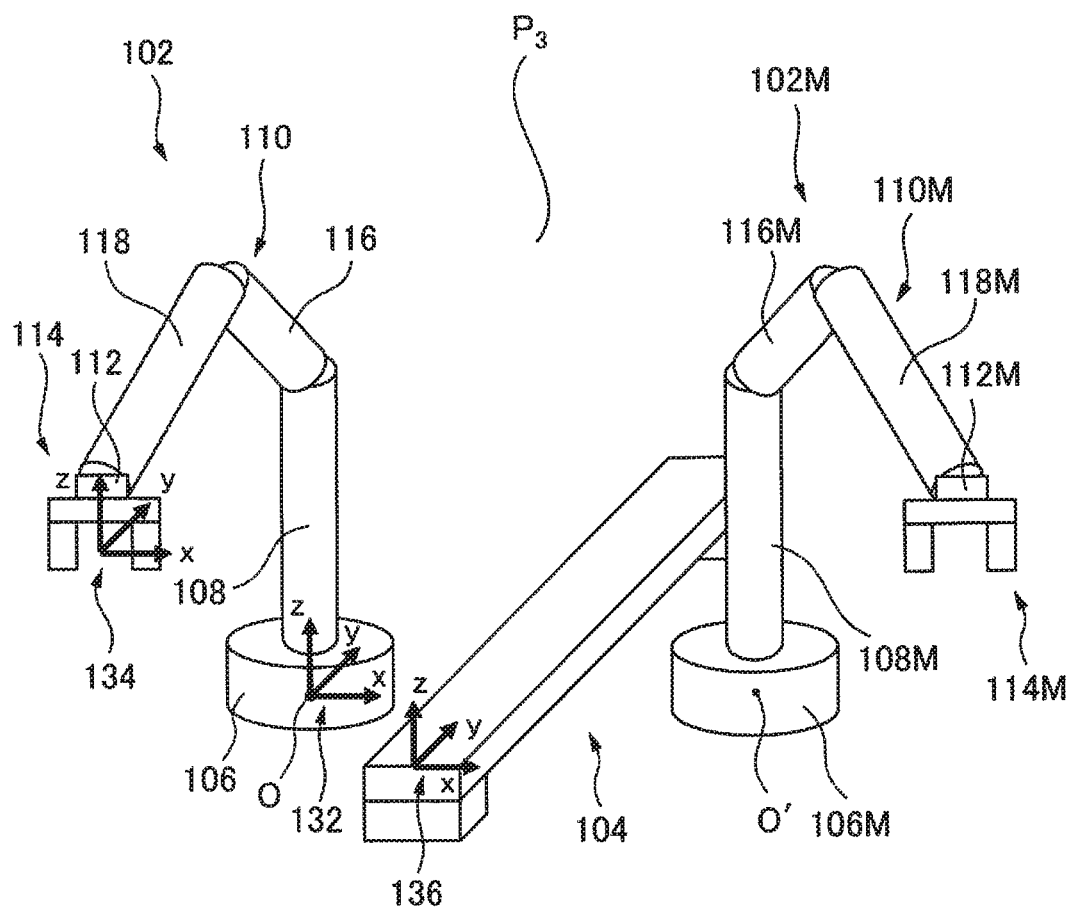
FIG. 8 is an image of virtual space generated in step S8 in FIG. 2.

As a result, as illustrated in FIG. 8, the symmetric robot base model 106M is arranged at a position symmetric to the original robot model 102 with respect to the reference plane $P_3$.

In step S9, the CPU 12 replicates the virtual operation parameters, and gives the virtual operation parameters to the generated symmetric component model. Specifically, the CPU 12 reads out and replicates the virtual robot operation parameters of the robot model 102 stored in the system memory 14, thereby creates second virtual robot operation parameters.

Then, the CPU 12 associates the second virtual robot operation parameters with the symmetric robot model 102M illustrated in FIG. 8, and stores the second virtual robot operation parameters in the system memory 14. These second virtual robot operation parameters are parameters necessary for simulatively operating the symmetric robot model 102M in the virtual space 100 in step S10 described later.

The second virtual robot operation parameters include an origin and axial directions of a second robot coordinate system 132' (FIG. 9), an origin and axial directions of a second tool coordinate system 134' (FIG. 9), a maximum drive speed, and a virtual movable range.

Figure 9:
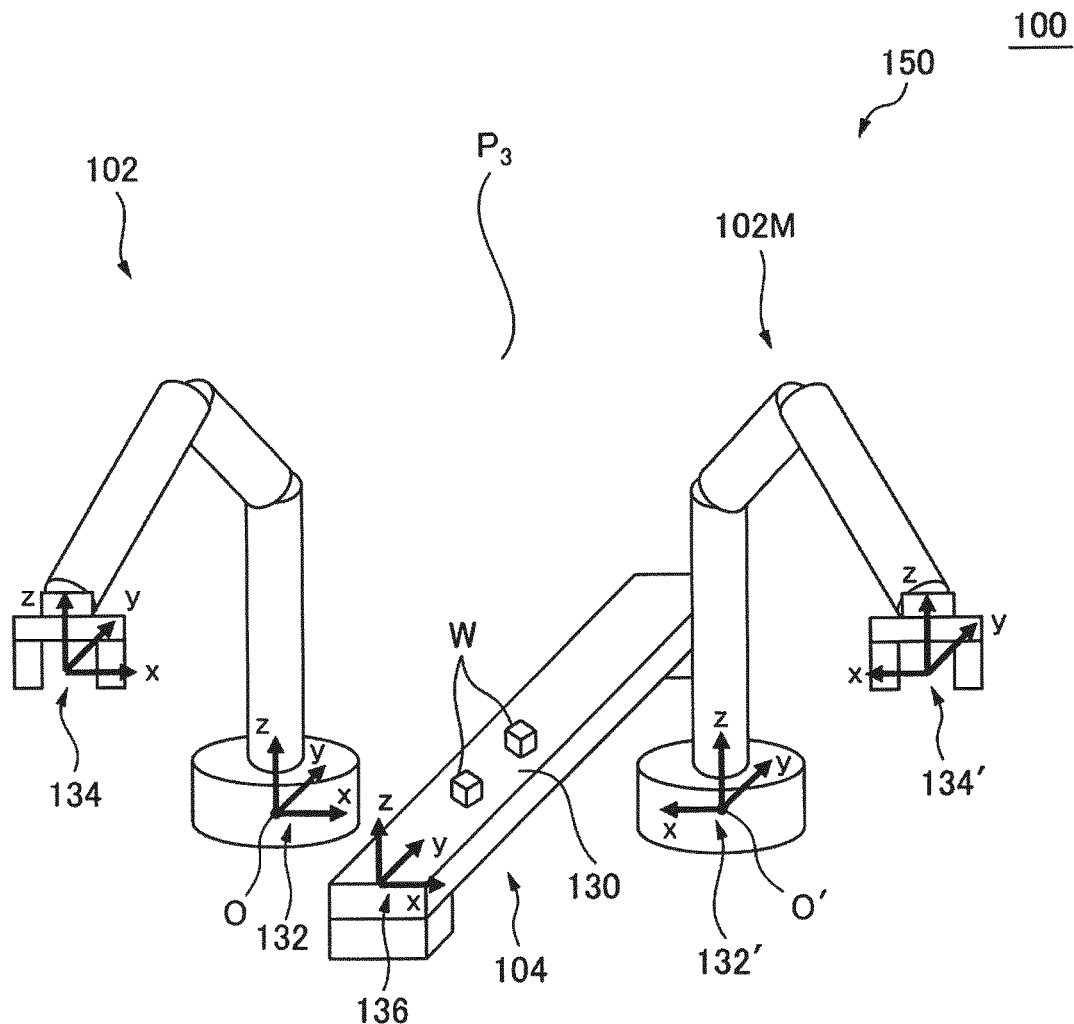
FIG. 9 is an image of virtual space generated in step S9 in FIG. 2.

As illustrated in FIG. 9, the origin of the second robot coordinate system 132' is arranged at the symmetric origin O' obtained in step S6, and the axial directions of the second robot coordinate system 132' are symmetric to those of the robot coordinate system 132 with respect to the reference plane $P_3$. Further, the origin and axial directions of the second tool coordinate system 134' are symmetric to those of the tool coordinate system 134 with respect to the reference plane $P_3$.

The maximum drive speed and the virtual movable range, etc., of the second virtual robot operation parameters are values identical to those of the virtual robot operation parameters associated with the robot model 102.

Thus, the newly-created second virtual robot operation parameters are given to the symmetric robot model 102M, and the CPU 12 operates the symmetric robot model 102M in the virtual space 100 in the following step S10 with using these second virtual robot operation parameters.

By carrying out the above-mentioned steps S1 to S9, as illustrated in FIG. 9, a robot system model 150 including the robot model 102, the conveyer model 104, and the symmetric robot model 102M is constructed in the virtual space 100.

In step S10, the CPU 12 carries out a simulation to simulatively operate the robot system model 150. Specifically, the CPU 12 simulatively operates the robot model 102, the conveyer model 104, and the symmetric robot model 102M in the virtual space 100, in accordance with the virtual robot operation parameters, the second virtual robot operation parameters, the virtual conveyer operation parameters, and a work program.

The work program is pre-stored in the system memory 14. For example, this work program is configured to carry out an operation that the robot model 102 and the symmetric robot model 102M grip a workpiece model W (FIG. 9) conveyed by the conveyor model 130 of the conveyer model 104 in the virtual space 100.

Thus, in this embodiment, the CPU 12 functions as a simulation part 32 (FIG. 1) configured to carry out a simulation to simulatively operate the robot model 102, the conveyer model 104, and the symmetric robot model 102M.

Next, the function of the simulation device 10 according to another embodiment are described with reference to FIGS. 2, 4, and 10 to 15.

Figure 10:
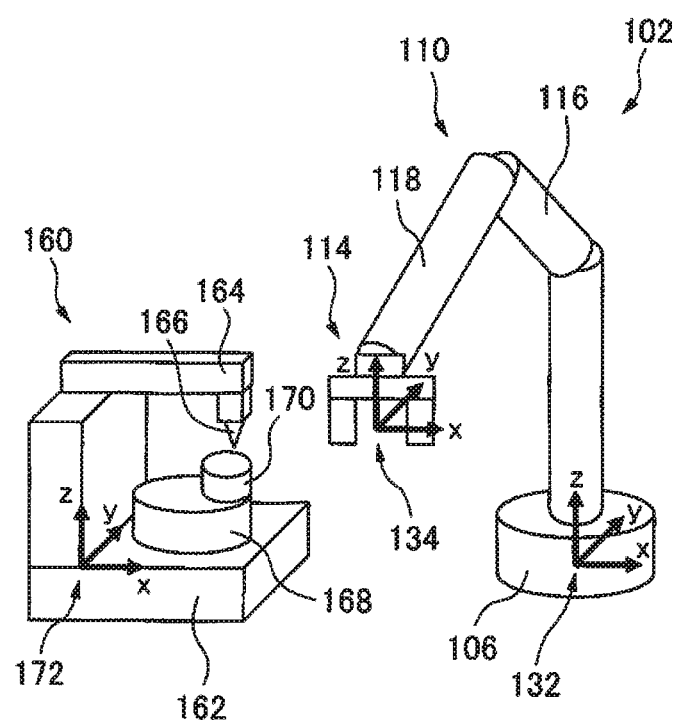
FIG. 10 is another example of the image of the virtual space generated in step S1 in FIG. 2.
Figure 10:
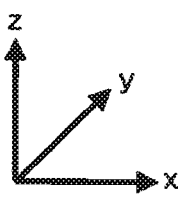
Figure 10:

In step S1, as illustrated in FIG. 10, the CPU 12 arranges the robot model 102 and a machine tool model 160 in the virtual space 100 in response to the input operation by the user.

The machine tool model 160 is a three-dimensional model of a machine tool capable of machining a workplace by a cutting tool, and includes a work table model 162, a spindle head model 164, a cutting tool model 166, a jig model 168, and a workpiece model 170.

The spindle head model 164 is provided at the work table model 162 so as to be movable in directions toward and away from the work table model 162. The cutting tool model 166 is rotatably provided at a distal end of the spindle head model 164.

The jig model 168 is provided on the work table model 162 so as to be immovable with respect to the work table model 162. The workpiece model 170 is mounted on the jig model 168.

The system memory 14 pre-stores a plurality of types of robot models including the robot model 102 and a plurality of types of machine tool models including the machine tool model 160. The CPU 12 generates image data in which the pluralities of types of robot models and machine tool models stored in the system memory 14 are represented in the form of a list, and displays it on the display 22.

The user operates the data input section 20 so as to select the robot model 102 and the machine tool model 160 from the list displayed on the display 22. The data input section 20 sends the input data input by the user to the CPU 12 via the I/O interface 18.

In response to the received input data, the CPU 12 reads out the robot model 102 and the machine tool model 160 from the pluralities of types of robot models and machine tool models stored in the system memory 14, and arranges the robot model 102 and the machine tool model 160 in the virtual space 100. Then, the CPU 12 generates image data of the virtual space 100 and displays it on the display 22 as an image of the virtual space 100 as illustrated in FIG. 10.

The system memory 14 stores various virtual machine tool operation parameters in association with the machine tool model 160. These virtual machine tool operation parameters are parameters necessary for simulatively operating the machine tool model 160 in the virtual space 100 in the following step S10.

The virtual machine tool operation parameters include an origin and axial directions of a machine tool coordinate system 172, a movement speed and virtual movable range of the work table model 162, a movement speed and virtual movable range of the spindle head model 164, positioning information of the workpiece model 170 with respect to the jig model 168, and a rotation speed of the cutting tool model 166, etc.

The machine tool coordinate system 172 is coordinate system used as a reference when the machine tool model 160 is operated in the virtual space 100, and is defined in the virtual space 100 by the origin and axial directions of the machine tool coordinate system 172 included in the virtual machine tool operation parameters.

In this embodiment, the origin of the machine tool coordinate system 172 is arranged at a predetermined position on the work table model 162, and the work table model 162 is moved along the x-y plane of the machine tool coordinate system 172.

As the work table model 162 is moved, the jig model 168 fixed on the work table model 162 and the workpiece model 170 mounted on the jig model 168 is also moved together with the work table model 162 along the x-y plane.

Further, the spindle head model 164 is moved along the z-axis of the machine tool coordinate system 172. Furthermore, the cutting tool model 166 is rotated about a rotational axis parallel to the z-axis.

The movement speed of the work table model 162 is a parameter for determining the speed at which the work table model 162 is moved in the virtual space 100. Further, the virtual movable range of the work table model 162 is a parameter representing the movement range of the work table model 162 in the x-y plane of the machine tool coordinate system 172.

The movement speed of the spindle head model 164 is a parameter for determining the speed at which the spindle head model 164 is moved in the virtual space 100. Further, the virtual movable range of the spindle head model 164 is a parameter representing the movement range of the spindle head model 164 along the z-axis of the machine tool coordinate system 172.

The positioning information of the workpiece model 170 with respect to the jig model 168 includes position coordinates of the workpiece model 170 with respect to the jig model 168 in the machine tool coordinate system 172, and a parameter relating to a method for clamping the workpiece model 170 by the jig model 168 (e.g., clamping the workpiece model 170 between two openable and closeable claws provided at the jig model 168).

The rotation speed of the cutting tool model 166 is a parameter for determining the rotation speed at which the spindle head model 164 rotates the cutting tool model 166 in the virtual space 100.

As illustrated in FIG. 10, the CPU 12 arranges the robot coordinate system 132, the tool coordinate system 134, and the machine tool coordinate system 172 in the virtual space 100, together with the robot model 102 and the machine tool model 160. Further, similarly as the embodiment illustrated in FIG. 3, the main coordinate system 138 is also arranged in the virtual space 100.

In step S2, the data input section 20 receives an input operation for selecting a component model. Specifically, the user operates the data input section 20 (e.g., a mouse) so as to select at least one of a plurality of component models (i.e., the robot model 102 and the machine tool model 160) displayed on the display 22.

Below, a case is described in which the user selects the machine tool model 160. In this case, the data input section 20 receives the input operation by the user, and sends the input data indicating the selection of the machine tool model 160 to the CPU 12 via the I/O interface 18. In response to the received input data, the CPU 12 determines the machine tool model 160 as the replication subject.

Note that, in order to improve the visibility for the user, the CPU 12 may highlight the machine tool model 160 determined as the replication subject in step S2 (e.g., change the type or tone of the color of the machine tool model 160, or blink the robot model 102) on the display 22.

In step S3, the data input section 20 receives an input operation for selecting a coordinate system used as a reference. Specifically, the user operates the data input section 20 (e.g., a mouse) so as to select one of the robot coordinate system 132, the tool coordinate system 134, the machine tool coordinate system 172, and the main coordinate system 138 in FIG. 10.

Below, a case is described in which the user selects the robot coordinate system 132. In this case, the data input section 20 receives the input operation by the user, and sends the input data indicating the selection of the robot coordinate system 132 to the CPU 12 via the I/O interface 18. In response to the received input data, the CPU 12 determines the robot coordinate system 132 as a reference coordinate system.

Subsequently, the CPU 12 displays the robot coordinate system 132 determined as the reference coordinate system on the display 22, as illustrated in FIG. 4. In the robot coordinate system 132 illustrated in FIG. 4, the origin O, the x-y plane $P_1$, the x-z plane $P_2$, and the y-z plane $P_3$ are displayed in addition to the x-axis, the y-axis, and the z-axis of the robot coordinate system 132.

In step S4, the data input section 20 receives an input operation for selecting the origin or axis of the coordinate system selected in step S3, or a plane defined by the selected coordinate system.

Specifically, the user operates the data input section 20 (e.g., a mouse) so as to select one of the origin O, the x-axis, the y-axis, the z-axis, the x-y plane $P_1$, the x-z plane $P_2$, and the y-z plane $P_3$ of the robot coordinate system 132 displayed on the display 22 as illustrated in FIG. 4.

Below, a case is described in which the user selects the y-z plane $P_3$ of the robot coordinate system 132. In this case, the data input section 20 receives the input operation by the user, and sends the input data indicating the selection of the y-z plane $P_3$ of the robot coordinate system 132 to the CPU 12 via the I/O interface 18.

In step S5, the CPU 12 sets a reference point, a reference axis, or a reference plane. Specifically, in accordance with the input data received from the data input section 20 in step S4, the CPU 12 sets the y-z plane $P_3$ of the robot coordinate system 132 illustrated in FIG. 4 as a reference plane $P_3$.

Figure 11:
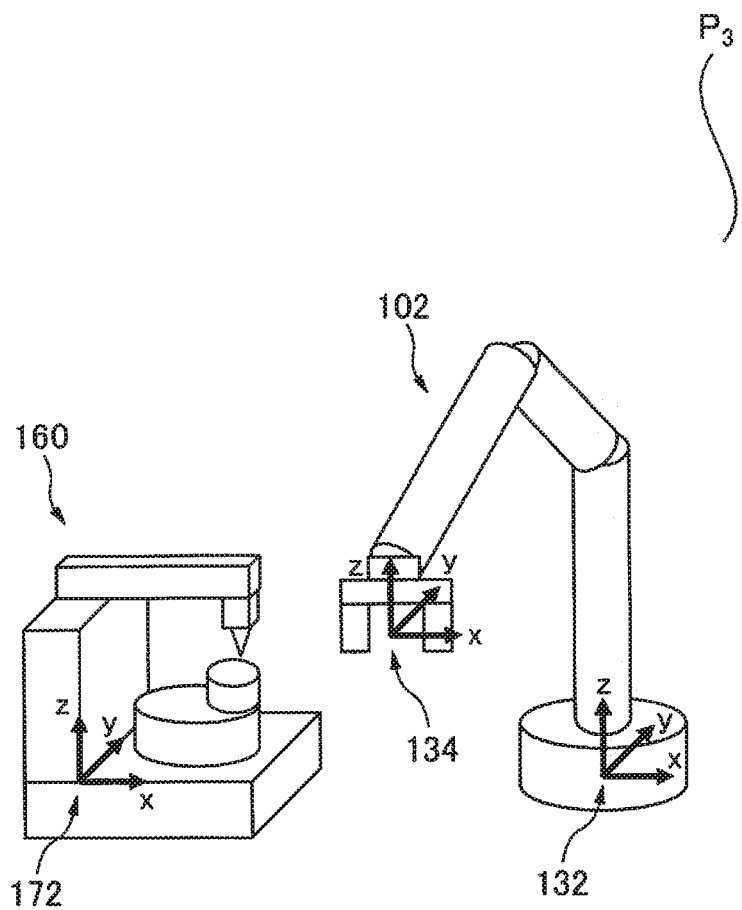
FIG. 11 is another example of the enlarged image of the coordinate system generated in step S4 in FIG. 2.

Then, the CPU 12 displays the reference plane $P_3$ on the display 22 as illustrated in FIG. 11. In FIG. 11, the reference plane $P_3$ is displayed enlarged for the user to easily recognize the reference plane $P_3$.

In step S6, the CPU 12 obtains a position symmetric to the component model with respect to the reference point, the reference axis, or the reference plane. As an example, the CPU 12 obtains the coordinates of a symmetric origin O' (FIG. 12) symmetric to the origin O of the machine tool coordinate system 172 with respect to the reference plane $P_3$.

Figure 12:
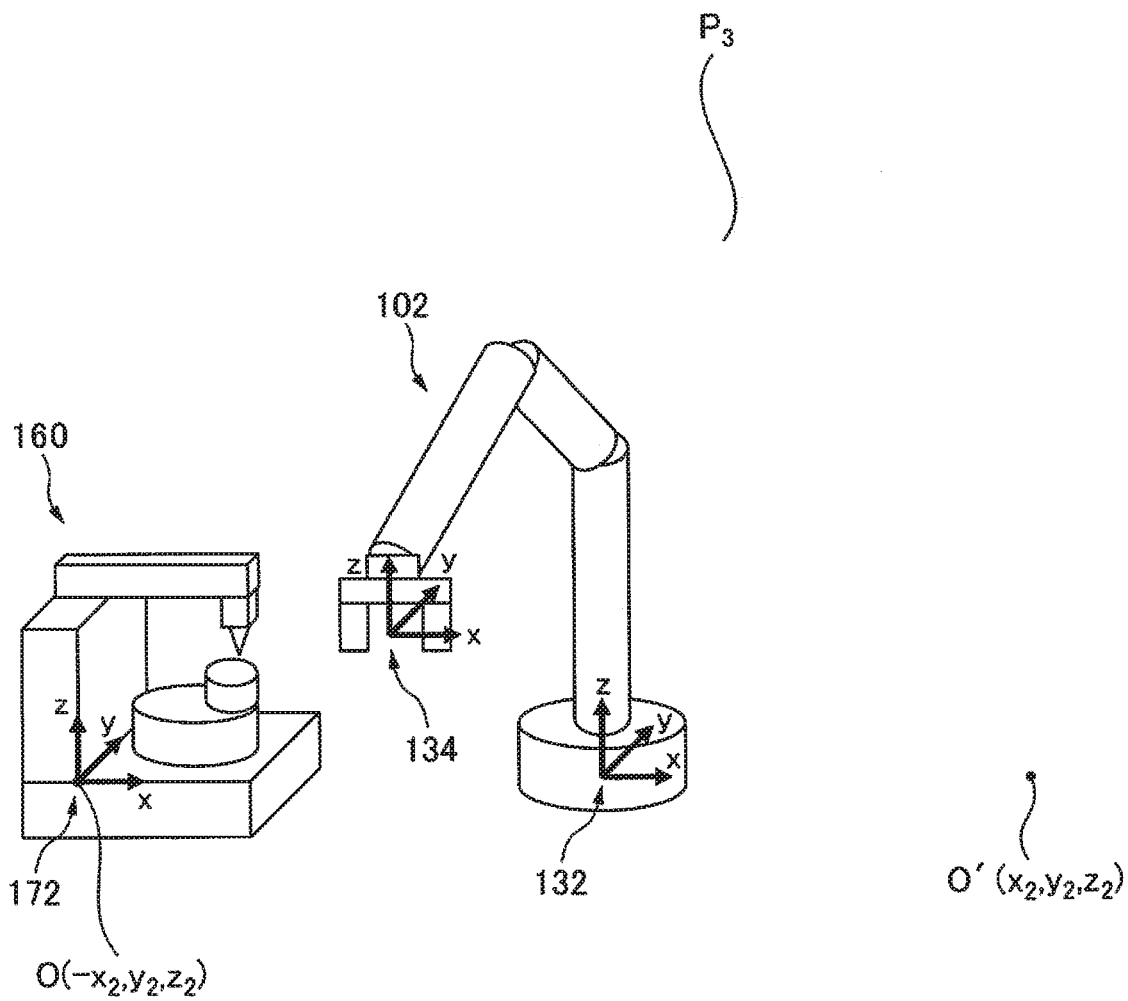
FIG. 12 is another example of the image of the virtual space generated in step S6 in FIG. 2.

For example, as illustrated in FIG. 12, if the coordinates in the robot coordinate system 132 of the origin O of the machine tool coordinate system 172 are $(-x_2, y_2, z_2)$, the coordinates of the symmetric origin O' can be obtained as $(x_2, y_2, z_2)$.

The CPU 12 stores thus-obtained coordinates $(x_2, y_2, z_2)$ of the symmetric origin O' found in this manner in the working memory 16 as coordinates representing the position symmetric to the machine tool model 160 with respect to the reference plane $P_3$.

In step S7, the CPU 12 generates a symmetric component model. Specifically, the CPU 12 generates a symmetric machine tool model 160M, which is a three-dimensional model symmetric to the machine tool model 160 determined as the replication subject in step S2 with respect to the reference plane $P_3$, with using information of the machine tool model 160 stored in the system memory 14.

Figure 13:
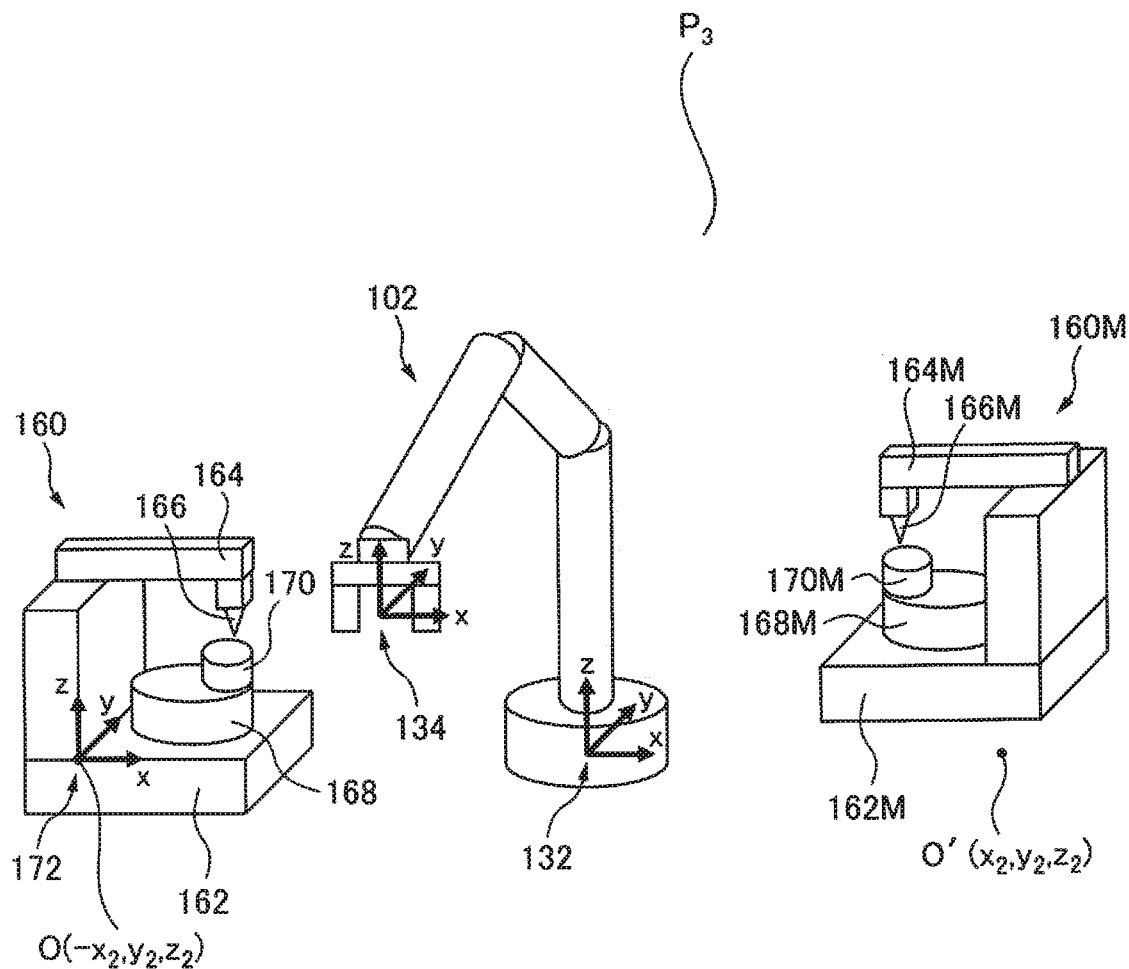
FIG. 13 is another example of the image of the virtual space generated in step S7 in FIG. 2.
Figure 13:
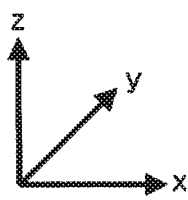
Figure 13:

The generated symmetric machine tool model 160M is illustrated in FIG. 13. This symmetric machine tool model 160M includes a symmetric work table model 162M, a symmetric spindle head model 164M, a symmetric cutting tool model 166M, a symmetric jig model 168M, and a symmetric workpiece model 170M.

The symmetric work table model 162M, the symmetric spindle head model 164M, the symmetric cutting tool model 166M, the symmetric jig model 168M, and the symmetric workpiece model 170M are three-dimensional models that have shapes symmetric to the work table model 162, the spindle head model 164, the cutting tool model 166, the jig model 168, and the workpiece model 170 respectively, with respect to the reference plane $P_3$.

In step S8, the CPU 12 arranges the symmetric component model at the position obtained in step S6. Specifically, the CPU 12 arranges the symmetric machine tool model 160M generated in step S7 at the symmetric origin O' detected in step S6.

At this time, the symmetric machine tool model 160M is arranged with respect to the symmetric origin O' so that the position of the symmetric origin O' with respect to the symmetric machine tool model 160M is the same as the position of the origin O of the machine tool coordinate system 172 with respect to the machine tool model 160.

More specifically, in this embodiment, the origin of the machine tool coordinate system 172 is arranged at the predetermined position on the work table model 162, as described above. Accordingly, the symmetric machine tool model 160M is arranged with respect to the symmetric origin O' so that the symmetric origin O' is arranged at the corresponding predetermined position on the symmetric work table model 162M.

Figure 14:
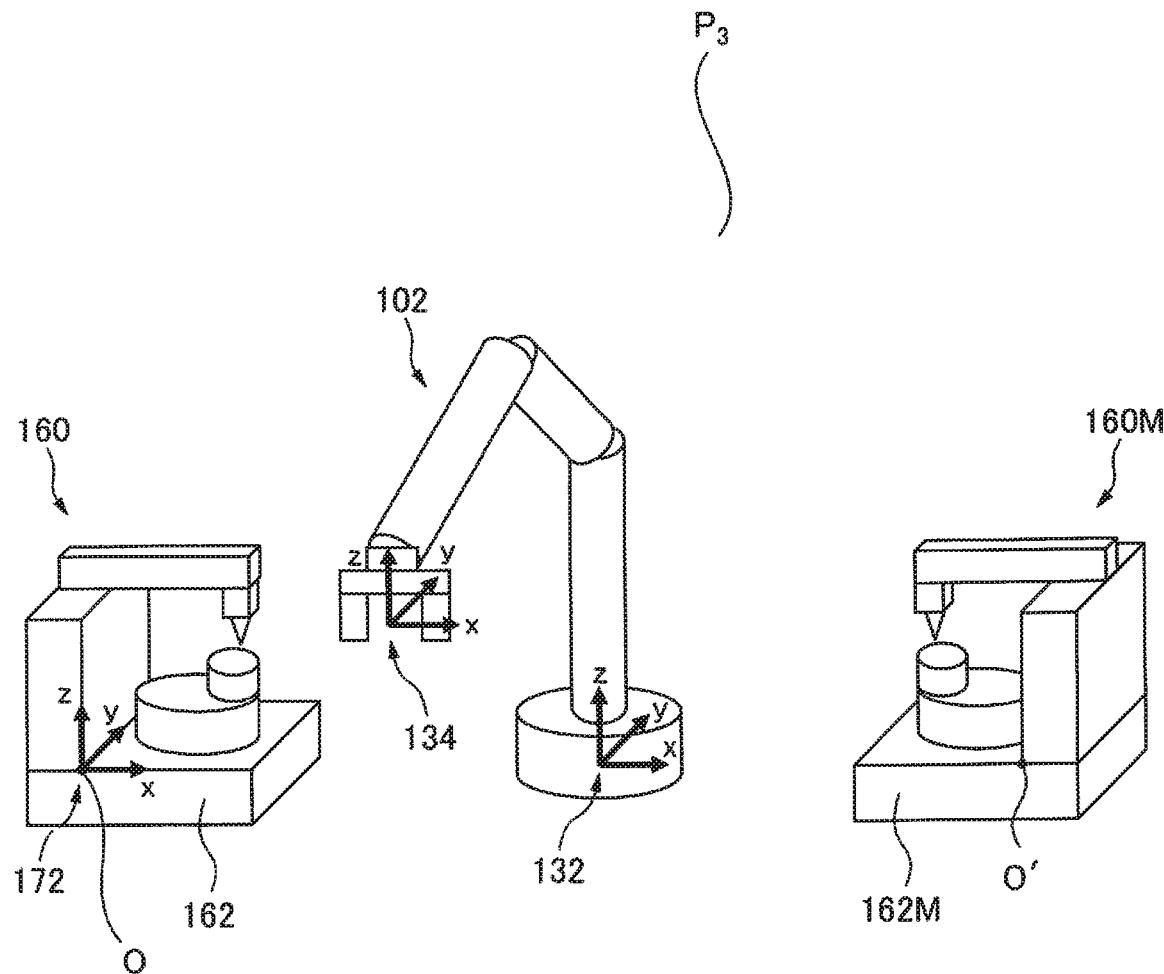
FIG. 14 is another example of the image of the virtual space generated in step S8 in FIG. 2.

As a result, as illustrated in FIG. 14, the symmetric machine tool model 160M is arranged at a position symmetric to the original machine tool model 160 with respect to the reference plane $P_3$.

In step S9, the CPU 12 replicates the virtual operation parameters, and gives them to the generated symmetric component model. Specifically, the CPU 12 reads out and replicates the virtual machine tool operation parameters of the machine tool model 160 that are stored in the system memory 14 so as to generate second virtual machine tool operation parameters.

Then, the CPU 12 associates the second virtual machine tool operation parameters with the symmetric machine tool model 160M illustrated in FIG. 14, and stores the second virtual machine tool operation parameters in the system memory 14. The second virtual machine tool operation parameters are parameters necessary for simulatively operating the symmetric machine tool model 160M in the virtual space 100 in the following step S10.

The second virtual machine tool operation parameters include an origin and axial directions of a second machine tool coordinate system 172' (FIG. 15), a movement speed and virtual movable range of the symmetric work table model 162M, a movement speed and virtual movable range of the symmetric spindle head model 164M, positioning information of the symmetric workpiece model 170M with respect to the symmetric jig model 168M (hereinafter, referred to as "second positioning information"), and a rotation speed of the symmetric cutting tool model 166M.

Figure 15:
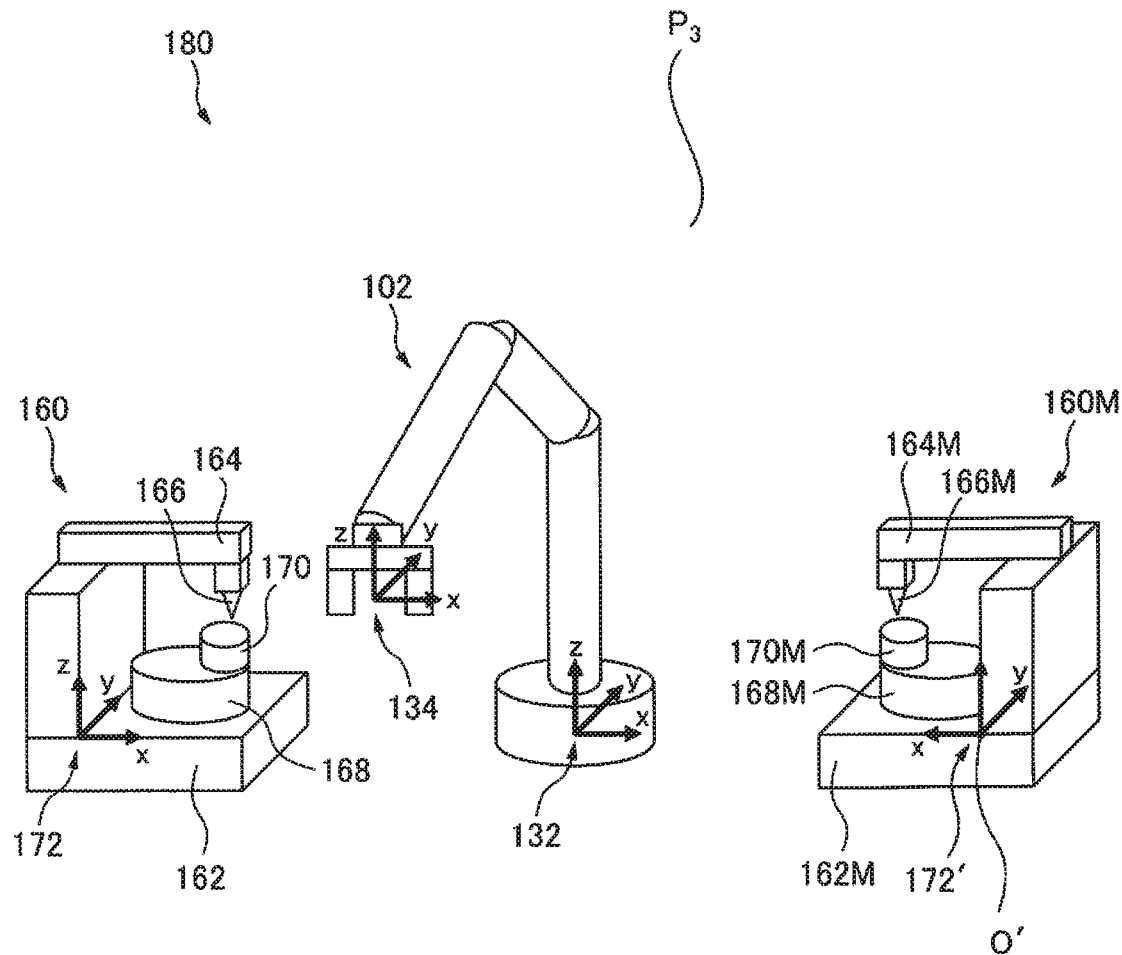
FIG. 15 is another example of the image of the virtual space generated in step S9 in FIG. 2.
Figure 15:
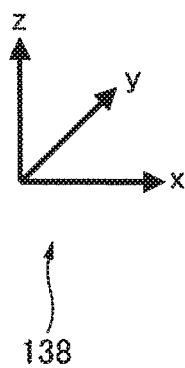

As illustrated in FIG. 15, the origin of the second machine tool coordinate system 172' is arranged at the symmetric origin O' obtained in step S6, and the axial directions of the second machine tool coordinate system 172' are symmetric to those of the machine tool coordinate system 172 with respect to the reference plane $P_3$.

The movement speed and virtual movable range of the symmetric work table model 162M, the movement speed and virtual movable range of the symmetric spindle head model 164M, and the rotation speed of the symmetric cutting tool model 166M, etc., included in the second virtual machine tool operation parameters are values identical to those of the virtual machine tool operation parameters associated with the machine tool model 160.

The second positioning information includes position information (hereinafter, referred to as "second position information") of the symmetric workpiece model 170M with respect to the symmetric jig model 168M in the second machine tool coordinate system 172', and a parameter relating to a method for clamping the symmetric workpiece model 170M by the symmetric jig model 168M (hereinafter, referred to as "second clamping method").

The second position information is replicated so as to be symmetric to the original position information with respect to the reference plane $P_3$. Further, the second clamping method is identical to the original clamping method.

Thus, the newly-generated second virtual machine tool operation parameters are given to the symmetric machine tool model 160M, and the CPU 12 operates the symmetric machine tool model 160M in the virtual space 100 in the following step S10 with using these second virtual machine tool operation parameters.

By carrying out the above-mentioned steps S1 to S9, as illustrated in FIG. 15, a robot system model 180 including the robot model 102, the machine tool model 160, and the symmetric machine tool model 160M is constructed in the virtual space 100.

In step S10, the CPU 12 carries outs a simulation to simulatively operate the robot system model 180. Specifically, the CPU 12 simulatively operates the robot model 102, the machine tool model 160, and the symmetric machine tool model 160M in the virtual space 100, in accordance with the virtual robot operation parameters, the virtual machine tool operation parameters, the second virtual machine tool operation parameters, and a work program.

The work program is pre-stored in the system memory 14. For example, this work program is configured to carry out an operation that the robot model 102 exchanges the workpiece model 170 mounted on the machine tool model 160 and the symmetric workpiece model 170M mounted on the symmetric machine tool model 160M in the virtual space 100.

As described above, in the above-mentioned embodiments, it is possible to easily replicate the component models (e.g., the robot model 102 or the machine tool model 160) of the robot system models 150 or 180 in the virtual space 100 so as to be symmetric with respect to a desired reference (point, axis, or plane).

According to this configuration, the work for constructing a layout of the robot system models 150 or 180 in the virtual space 100 for a simulation can be significantly made easier.

Further, in the embodiments described above, when generating the symmetric component model (e.g., the symmetric robot model 102M or the symmetric machine tool model 160M), the CPU 12 replicates the virtual operation parameters of the original component model (e.g., the robot model 102 or the machine tool model 160) and gives them to the generated symmetric component model.

As a result, it is possible to smoothly and reliably carry out the simulation for simulatively operating the generated symmetric component model in step S10.

Note that, in step S8 described above, when arranging the generated symmetric component model (e.g., the symmetric robot model 102M or the symmetric machine tool model 160M) at the symmetric position, the CPU 12 may delete the original component model (e.g., the robot model 102 or the machine tool model 160).

This means that, the original component model (e.g., the robot model 102 or the machine tool model 160) is inverted and moved to the symmetric component model (e.g., the symmetric robot model 102M or the symmetric machine tool model 160M).

Further, in step S3 described above, the user may select any coordinate system in the virtual space 100. Moreover, in step S4 described above, the user may select any of the origin O, the x-axis, the y-axis, the z-axis, the x-y plane $P_1$, the x-z plane $P_2$, and the y-z plane $P_3$ of the coordinate system (e.g., the conveyer coordinate system 136 or the robot coordinate system 132) as the reference.

For example, when the user selects the z-axis of the coordinate system as the reference, the CPU 12 may generate a symmetric component model which is rotationally symmetric to the component model (e.g., the robot model 102 or the machine tool model 160) selected in step S2 with respect to the z-axis.

In this case, the data input section 20 may receive from the user an angle θ about the z-axis between the original component model and the symmetric component model to be generated. In this case, the CPU 12 generates the symmetric component model so that the angle about the z-axis between the original component model and the generated symmetric component model is θ (i.e., copies with rotation by the angle θ).

Further, in step S6 described above, the CPU 12 may obtain the position symmetric to the component model with respect to the reference point, the reference axis, or the reference plane, on the basis of the main coordinate system 138, for example.

Specifically, in the case of the embodiment illustrated in FIG. 6, assuming that the coordinates in the main coordinate system 138 of the origin O of the robot coordinate system 132 are $(x_3, y_3, z_3)$, the CPU 12 calculates the coordinates $(x_4, y_4, z_4)$ in the main coordinate system 138 of the symmetric origin O' from the coordinates $(x_3, y_3, z_3)$ of the origin O and the reference plane $P_3$.

Further, in step S1 described above, the CPU 12 may arrange in the virtual space 100 a three-dimensional model of any component (e.g., a vision sensor, loader, or the like) used in an industrial robot system, other than the above-mentioned robot model 102, the conveyer model 104, or the machine tool model 160.

Furthermore, at least one of the system memory 14, the working memory 16, the I/O interface 18, the data input section 20, and the display 22 may be omitted from the above-described simulation device 10.

In this case, the simulation device 10 may be comprised of only the CPU 12, and the at least one of the omitted system memory 14, the working memory 16, the I/O interface 18, the data input section 20, and the display 22 may be configured as an external device attached to the simulation device 10.

The invention has been described with reference to the embodiments thereof, but the embodiments should not be construed to limit the invention recited in the claims. While embodiments including combinations of the features described in the embodiments of the invention may be included in the technical scope of the invention, all the combinations of the features are not necessarily essential for the solution of the invention. Furthermore, it is apparent to those skilled in the art that various alterations and improvements can be added to the embodiments described above.

Further, it should be noted that respective processes, such as the operations, procedures, steps, routines, and stages performed by an apparatus, system, program, and method shown in the claims, specification, and diagrams can be performed in any order as long as the order is not indicated by "prior to," "before," or the like and as long as the output from a previous process is not used in a later process. Even if the operation flow is described using phrases such as "first", "next", "subsequently", "then", or the like in the claims, embodiments, or diagrams, it does not necessarily mean that the process must be performed in this order.

The invention claimed is:

1. A simulation device configured to carry out a simulation of an operation of a robot system, the simulation device comprising:
    a processor configured to
        arrange a plurality of component models in a virtual space, the plurality of component models being three-dimensional models of a plurality of components of the robot system, a virtual operation parameter being given to each component model of the plurality of component models for simulatively operating the component model in the virtual space, the virtual operation parameter including a control coordinate system used as a reference for operation of the component model in the virtual space, each component model being arranged in the virtual space together with the respective control coordinate system,
        receive
            an input operation for selecting a first control coordinate system of a first component model of the plurality of component models,
            an input operation for selecting a second control coordinate system of a second component model of the plurality of component models, and
            an input operation for selecting an origin of the selected second control coordinate system, an axis of the selected second control coordinate system, or a plane defined by the selected second control coordinate system,
        set the selected origin, the selected axis, or the selected plane of the second control coordinate system as a reference point, a reference axis, or a reference plane in the virtual space,
        generate a symmetric component model which is a three-dimensional model symmetric to the selected first component model arranged in the virtual space with respect to the reference point, the reference axis, or the reference plane defined by the second component model, and
        carry out a simulation to simulatively operate the first and second component models and the symmetric component model in the virtual space,
    wherein the simulation device is configured to construct a layout of the robot system and simulate the operation of the robot system in the virtual space.

2. The simulation device of claim 1, wherein
the processor is configured to
    replicate the virtual operation parameter of the first component model, and
    give the virtual operation parameter to the generated symmetric component model.

3. The simulation device of claim 2, wherein the robot system includes a robot configured to grip a workpiece, a conveyer configured to convey the workpiece, or a machine tool configured to machine the workpiece,
    wherein the component model includes:
        a robot model which is a three-dimensional model of the robot,
        a conveyer model which is a three-dimensional model of the conveyer, or
        a machine tool model which is a three-dimensional model of the machine tool,
    wherein the virtual operation parameter includes a parameter relating to:
        an origin and axis directions of a robot coordinate system as the control coordinate system, which is used as a reference when simulatively operating the robot model in the virtual space,
        an origin and axis directions of a conveyer coordinate system as the control coordinate system, which is used as a reference when simulatively operating the conveyer model in the virtual space, or
        an origin and axis directions of a machine tool coordinate system as the control coordinate system, which is used as a reference when simulatively operating the machine tool model in the virtual space.

4. The simulation device of claim 3, wherein
the first component model is one of the robot model, conveyer model, or machine tool model, and the second component model is one of the robot model, conveyer model, or machine tool model different from the first component model.

5. The simulation device of claim 1, wherein the processor is configured to:
    obtain a position of a symmetric origin symmetric to an origin of the first control coordinate system of the first component model with respect to the reference point, the reference axis, or the reference plane; and
    arrange the generated symmetric component model with respect to the symmetric origin such that a positional relation of the origin of the first control coordinate system with respect to the first component model is the same as that of the symmetric origin with respect to the generated symmetric component model, and that the generated symmetric component model is symmetric to the first component model with respect to the reference point, the reference axis, or the reference plane.

6. The simulation device of claim 1, wherein a different coordinate system from the control coordinate systems is arranged in the virtual space,
    wherein the processor is configured to receive
        an input operation for selecting the different coordinate system, and
        an input operation for selecting an origin of the selected different coordinate system, an axis of the selected different coordinate system, or a plane defined by the selected different coordinate system, and
    wherein, in response to receiving the input operation for selecting the different coordinate system and the input operation for selecting the origin, the axis, or the plane of the different coordinate system, the processor is configured to set the selected origin, the selected axis, or the selected plane of the different coordinate system as the reference point, the reference axis, or the reference plane.

7. The simulation device of claim 1, wherein each of the plurality of components of the robot system includes a movable part,
    each of the plurality of component models includes a movable part model being a three-dimensional model of the movable part,
    the virtual operation parameter further includes another control coordinate system used as a reference for operation of the movable part model in the virtual space, and
    the processor is configured to carry out the simulation to simulatively operate the movable part model of each of the plurality of component models and a movable part model of the symmetric component model in the virtual space.

8. A method of carrying out a simulation of an operation of a robot system, the method comprising:
    arranging a plurality of component models in a virtual space, the plurality of component models being three-dimensional models of a plurality of components of the robot system, a virtual operation parameter being given to each component model of the plurality of component models for simulatively operating the component model in the virtual space, the virtual operation parameter including a control coordinate system used as a reference for operation of the component model in the virtual space, each component model being arranged in the virtual space together with the respective control coordinate system;
    receiving an input operation for selecting a first control coordinate system of a first component model of the plurality of component models;
    receiving an input operation for selecting a second control coordinate system of a second component model of the plurality of component models, and an input operation for selecting an origin of the selected second control coordinate system, an axis of the selected second control coordinate system, or a plane defined by the selected second control coordinate system;
    setting the selected origin, the selected axis, or the selected plane of the second control coordinate system as a reference point, a reference axis, or a reference plane in the virtual space;
    generating a symmetric component model which is a three-dimensional model symmetric to the selected first component model arranged in the virtual space with respect to the reference point, the reference axis, or the reference plane defined by the second component model; and
    carrying out a simulation to simulatively operate the first and second component models and the symmetric component model in the virtual space,
    wherein a construction of a layout of the robot system and the simulation of the operation of the robot system are performed in the virtual space.

9. A non-transitory computer-readable recording medium configured to record a computer program for carrying out a simulation of an operation of a robot system, the computer program causing a computer to execute:
    arranging a plurality of component models in a virtual space, the plurality of component models being a three-dimensional models of a plurality of components of the robot system, a virtual operation parameter being given to each component model of the plurality of component models for simulatively operating the component model in the virtual space, the virtual operation parameter including a control coordinate system used as a reference for operation of the component model in the virtual space, each component model being arranged in the virtual space together with the respective control coordinate system,
    receiving
        an input operation for selecting a first control coordinate system of a first component model of the plurality of component models,
    receive
        an input operation for selecting a second control coordinate system of a second component model of the plurality of component models, and
        an input operation for selecting an origin of the selected second control coordinate system, an axis of the selected second control coordinate system, or a plane defined by the selected second control coordinate system,
    setting the selected origin, the selected axis, or the selected plane of the second control coordinate system as a reference point, a reference axis, or a reference plane in the virtual space,
    generating a symmetric component model which is a three-dimensional model symmetric to the selected first component model arranged in the virtual space with respect to the reference point, the reference axis, or the reference plane defined by the second component model, and carrying out a simulation to simulatively operate the component model and the symmetric component model in the virtual space,
wherein the non-transitory computer-readable recording medium records the computer program causing the computer to execute constructing a layout of the robot system and simulating the operation of the robot system in the virtual space.

\* \* \* \* \*